P. & N. H. JOHNSON.
Miter Box.
No. 166,010. Patented July 27, 1875.
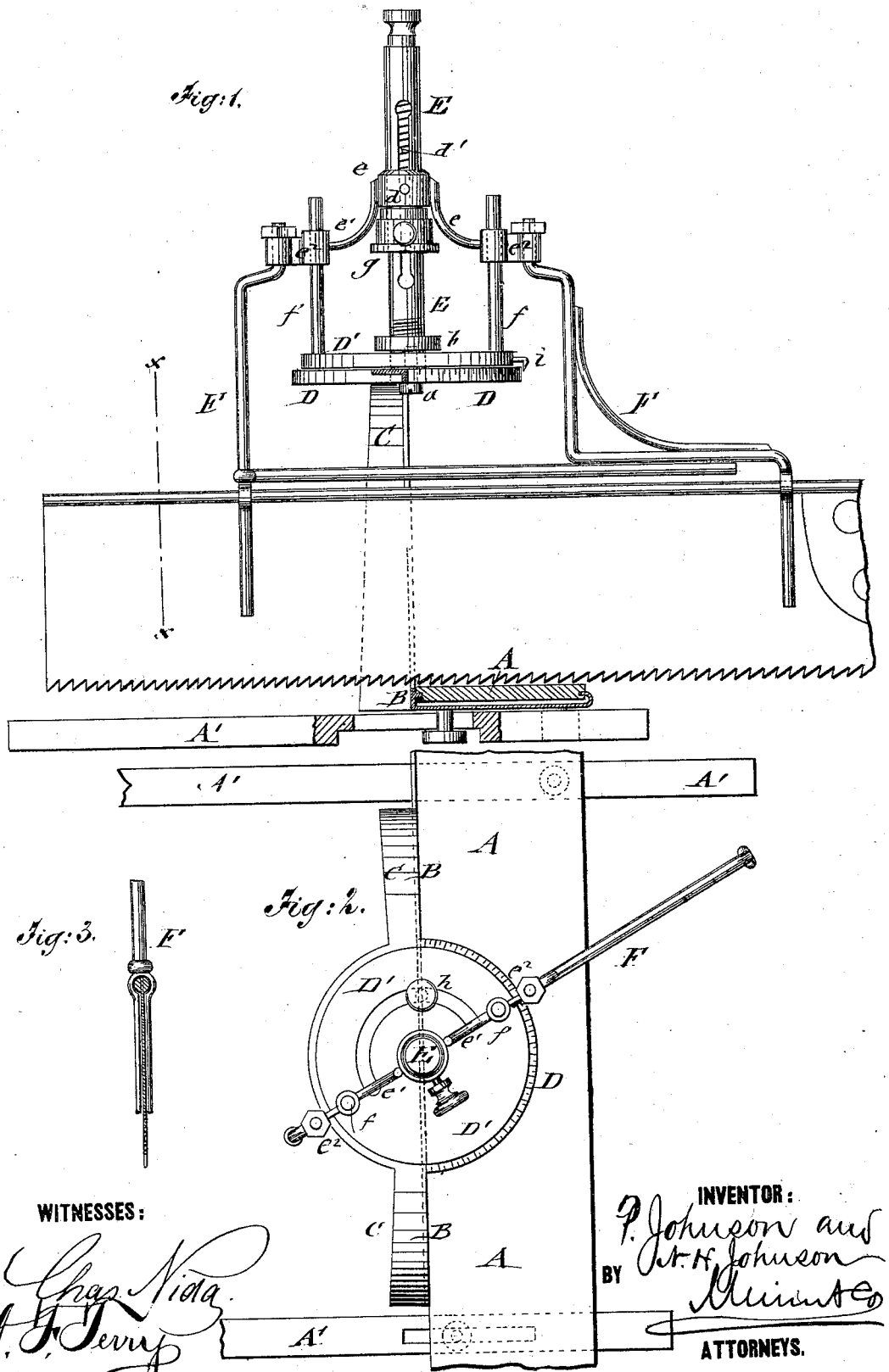

UNITED STATES PATENT OFFICE.

PETER JOHNSON, OF WAUCONDA, AND NICHOLAS H. JOHNSON, OF BLACKBERRY, ILLINOIS.

IMPROVEMENT IN MITER-BOXES.

Specification forming part of Letters Patent No. 166,010, dated July 27, 1875; application filed April 3, 1875.

*To all whom it may concern:*

Be it known that we, PETER JOHNSON, of Wauconda, in the county of Lake and State of Illinois, and NICHOLAS H. JOHNSON, of Blackberry, in the county of Kane and State of Illinois, have invented an Improvement in Miter-Boxes, of which the following is a specification:

In the accompanying drawing, Figure 1 represents a sectional side elevation of our improved miter-box; Fig. 2, a plan view of the same, and Fig. 3 a vertical transverse section on the line $x\ x$, Fig. 1, showing saw-guides.

Similar letters of reference indicate corresponding parts.

The invention will be fully described in connection with drawing, and then pointed out in the claims.

In the drawing, A represents the table of our improved miter-box, which is supported on pivoted base-arms A' that may be folded to the under side of the table after use. The centrally-slotted vertical wall B is provided with supporting-standards C of suitable strength that carry the stationary graduated disk D. A center post, E, is applied vertically to disk D, and set to a lower position thereon by means of a set-screw, $a$, and an upper-jaw nut, $b$, for the purpose of lowering the saw-guide frame so as to compensate for the shortening of the saw by the gradual filing off of the teeth. The center post E is slotted for the cross-pin $d$ of a sliding sleeve, $e$, which pin is attached to the lower end of a spiral spring, $d'$, secured to the upper end of the post. The sliding spring-cushioned sleeve $e$ supports on branch arms $e^1$ with end sleeves $e^2$ sliding on pillars $f$ of a revolving base-plate, D', the saw-guide frame F, which extends downward below the supporting-disk and carries in forked guide ends the saw for cutting the miter in the manner shown in Fig. 3. The saw-guide frame and saw is thus supported on the sliding sleeve and spring of the center post, and may be set thereon to regulate the depth of cut by a sliding gage-nut and set-screw, $g$. The revolving base-plate D' is also slotted and clamped by set-screw $h$ to the supporting-disk D after its index-point $i$ has been adjusted to the required mitering-angle on the graduated circumference of the disk. The miter-box may be set to cut any angle and the saw-guide frame be swung, on taking out the saw, sidewise to the vertical wall along which the saw is placed, so that the implement takes up small place. The saw is readily and easily guided in the vertically sliding and cushioned saw-frame, admitting of rapid and accurate working therewith.

Having thus described our invention, we claim as new and desire to secure by Letters Patent—

1. In miter-boxes, the table A provided with supporting-arms A' folding under the table, as and for the purpose described.

2. A saw-frame, F, having a side sleeve, $e$, in combination with a spiral spring having pin $d$ and secured in post, for the purpose set forth.

PETER JOHNSON.
NICHOLAS H. JOHNSON.

Witnesses:
T. B. MOSHER,
ALEX. F. ROBERTS.